United States Patent
Iguchi et al.

(10) Patent No.: US 11,082,750 B2
(45) Date of Patent: Aug. 3, 2021

(54) TRANSMISSION METHOD, RECEPTION METHOD, TRANSMISSION APPARATUS, AND RECEPTION APPARATUS

(71) Applicant: Panasonic Intellectual Property Corporation of America, Torrance, CA (US)

(72) Inventors: Noritaka Iguchi, Osaka (JP); Tadamasa Toma, Osaka (JP); Hisaya Katou, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/047,642

(22) Filed: Jul. 27, 2018

(65) Prior Publication Data

US 2018/0338186 A1    Nov. 22, 2018

Related U.S. Application Data

(63) Continuation of application No. 15/063,602, filed on Mar. 8, 2016, now Pat. No. 10,070,199, which is a (Continued)

(30) Foreign Application Priority Data

Aug. 27, 2014  (JP) ................................ 2014-173071

(51) Int. Cl.
| | |
|---|---|
| *H04N 21/643* | (2011.01) |
| *H04N 21/8547* | (2011.01) |
| *H04N 21/236* | (2011.01) |
| *H04N 21/434* | (2011.01) |
| *H04N 21/61* | (2011.01) |

(52) U.S. Cl.
CPC . *H04N 21/64322* (2013.01); *H04N 21/23605* (2013.01); *H04N 21/4343* (2013.01); *H04N 21/6143* (2013.01); *H04N 21/8547* (2013.01)

(58) Field of Classification Search
CPC ........... H04N 21/23605; H04N 21/242; H04N 21/43–21/4307; H04N 21/4343; H04N 21/6143; H04N 21/64322; H04N 21/8547
See application file for complete search history.

(56) References Cited

U.S. PATENT DOCUMENTS

| | | |
|---|---|---|
| 2006/0064716 A1 | 3/2006 | Sull |
| 2016/0149994 A1 | 5/2016 | Kitazato |

FOREIGN PATENT DOCUMENTS

| | | |
|---|---|---|
| JP | 2011-103568 | 5/2011 |
| WO | 2015/022827 | 2/2015 |

OTHER PUBLICATIONS

International Search Report dated Dec. 2, 2014 in International (PCT) Application No. PCT/JP2014/004591.
(Continued)

*Primary Examiner* — Pao Sinkantarakorn
(74) *Attorney, Agent, or Firm* — Wenderoth, Lind & Ponack, L.L.P.

(57) ABSTRACT

A transmission method includes: generating one or more frames for content transfer, each of the frames containing one or more second transfer units, each of the second transfer units being placed at a head within each of the frames and containing one or more first transfer units, each of the first transfer units containing one or more Internet Protocol (IP) packets, each of the first transfer units positioned at a head within each of the frames containing reference clock information indicating time used for reproduction of the content that uses the IP packets in a reception apparatus; and transmitting the one or more frames by broadcast.

7 Claims, 18 Drawing Sheets

DATA TYPE = IP PACKET

| REFERENCE CLOCK INFORMATION | DATA TYPE | DATA LENGTH | IP PACKET |
|---|---|---|---|

Related U.S. Application Data continuation of application No. PCT/JP2014/004591, filed on Sep. 8, 2014.

(60) Provisional application No. 61/880,304, filed on Sep. 20, 2013.

(56) References Cited

OTHER PUBLICATIONS

"Information technology—High efficiency coding and media delivery in heterogeneous environments—Part 1: MPEG media transport (MMT)", ISO/IEC FDIS 23008-1, 2013.

Extended European Search Report dated Jul. 7, 2016 in corresponding European Application No. 14845940.7.
Sung Oh Hwang et al., "Guidelines on how to prove MMT transport over Broadcasting Network", XP030058054, Apr. 2014.
Office Action dated Feb. 7, 2018 in European Patent Application No. 14 845 940.7.
English Translation of "Transmission System for Advanced Wide Band Digital Satellite Broadcasting Association of Radio Industries and Businesses", Jul. 31, 2014 (Jul. 31, 2014), XP055314241, Retrieved from the Internet: URL:http://www.arib.or.jp/english/html/overview/doc/6-STD-B 44v2_0-E1.pdf.
Mills D L: "RFC 958—Network Time Protocol (NTP)", Internet Citation, Sep. 1985, XP002260870, Retrieved from the Internet: URL:http://www.faqs.org/rfcshfc958.html [retrieved on Nov. 10, 2003].
Summons to attend oral proceedings pursuant to Rule 115(1) EPC dated Apr. 10, 2019 in European Patent Application No. 14845940.7.

FIG. 13

| | | | |
|---|---|---|---|
| Slot #1 | SLOT HEADER | TLV #1 | TLV #2 |
| Slot #2 | SLOT HEADER | TLV #2 | TLV #3 |
| ⋮ | | | |
| Slot #119 | SLOT HEADER | TLV #n | TLV #(n+1) |
| Slot #120 | SLOT HEADER | TLV #(n+1) | TLV #(n+2) |

FIG. 14

| HEAD TLV INSTRUCTION | UNDEFINED |

TRANSMISSION METHOD, RECEPTION METHOD, TRANSMISSION APPARATUS, AND RECEPTION APPARATUS

BACKGROUND

1. Technical Field

The present disclosure relates to a transmission method and reception method for transmitting the content by using Internet Protocol (IP) packets through broadcast.

2. Description of the Related Art

A Moving Picture Experts Group media transport (MMT) scheme (refer to NPTL 1) is a multiplexing scheme for multiplexing and packetizing content such as video and audio and for transmitting the content through one or more transfer channels such as broadcast and broadband. When the MMT scheme is applied to broadcasting systems, reference clock information on a transmission side is transmitted to a reception side, and a reception apparatus generates a system clock in the reception apparatus based on the reference clock information.

CITATION LIST

Non-Patent Literature

NPTL 1: Information technology-High efficiency coding and media delivery in heterogeneous environment-Part1: MPEG media transport (MMT), ISO/IEC DIS 23008-1

SUMMARY

In one general aspect, the techniques disclosed here feature a transmission method including: generating one or more frames for content transfer, each of the frames containing one or more second transfer units, each of the second transfer units containing one or more first transfer units, each of the first transfer units containing one or more Internet Protocol (IP) packets, each of the first transfer units positioned at a head within each of the frames among the one or more first transfer units containing reference clock information indicating time used for reproduction of the content that uses the IP packets in a reception apparatus; and transmitting the one or more frames by broadcast.

One non-limiting and exemplary embodiment provides a transmission method capable of reducing processes for acquiring reference clock information on a reception side.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF DRAWINGS

FIG. 13 is a diagram illustrating structure of a transfer slot;

FIG. 14 is a diagram illustrating structure of a slot header of the transfer slot;

Figure 1:
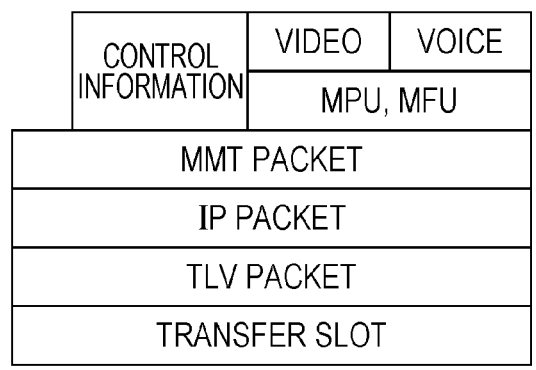
FIG. 1 is a protocol stack diagram for performing transfer using the MMT scheme and an advanced BS (Broadcast Satellite) transfer scheme.

DETAILED DESCRIPTION (Underlying Knowledge Forming Basis of the Present Disclosure)

The present disclosure relates to a method and apparatus for transmitting reference clock information from a transmission side, receiving the reference clock information on a reception side, and generating (reproducing) a reference clock in a hybrid delivery system using the MMT (MPEG Media Transport) scheme which is under standardization by MPEG (Moving Picture Expert Group).

The MMT scheme is a multiplexing scheme for multiplexing and packetizing video and audio to transmit the video and audio via one or more transfer channels, such as broadcast and broadband.

When the MMT scheme is applied to a broadcasting system, the reference clock on the transmission side is synchronized with NTP (Network Time Protocol) prescribed by IETF RFC 5905, and based on the reference clock, a time stamp such as PTS (Presentation Time Stamp) and DTS (Decode Time Stamp) is added to a medium. Furthermore, the reference clock information on the transmission side is transmitted to the reception side, and a reception apparatus generates the reference clock (hereinafter referred to as a system clock) in the reception apparatus based on the reference clock information.

In the broadcasting system, a 64-bit long-format NTP capable of indicating absolute time is preferably used as the reference clock information. However, according to the conventional MMT scheme, although storing a 32-bit short-format NTP in the MMT packet header and transferring the 32-bit short-format NTP is prescribed, transferring the long-format NTP is not prescribed, and a receiver device side may not acquire high-precision reference clock information.

In contrast, it is possible to define the long-format NTP as control information, such as a message, a table, or a descriptor, and to append the MMT packet header to the control information for transfer. In this case, the MMT packet is, for example, stored in the IP packet, and is transferred through a broadcast channel or a broadband channel.

When the MMT packet is transferred using the advanced BS transfer scheme prescribed by the ARIB standard, after encapsulation of the MMT packet into the IP packet and encapsulation of the IP packet into a TLV (Type Length Value) packet, the MMT packet is stored in a transfer slot prescribed by the advanced BS transfer scheme.

However, when the reference clock information is stored in the MMT packet layer on the transmission side, in order to obtain the reference clock information on the reception side, a plurality of processes is involved including extracting the TLV packet from the transfer slot, extracting the IP packet from the TLV packet, extracting the MMT packet from the IP packet, and further extracting the reference clock information from the header or a payload of the MMT packet. Many processes are required for acquiring the reference clock information, and longer time is required until the acquisition.

Also, processes in layers equal to or higher than the IP layer are typically software processes. When the reference clock information is stored in the MMT packet, the reference clock information is extracted and reproduced by a software program. In this case, measures need to be taken against jitter generated in the reference clock information to be acquired, due to throughput of a CPU, interruption from and priority of other software programs, and the like.

Therefore, a transmission method according to one aspect of the present disclosure includes: generating one or more frames for content transfer, each of the frames containing one or more second transfer units, each of the second transfer units containing one or more first transfer units, each of the first transfer units containing one or more Internet Protocol (IP) packets, each of the first transfer units positioned at a head within each of the frames among the one or more first transfer units containing reference clock information indicating time used for reproduction of the content that uses the IP packets in a reception apparatus; and transmitting the one or more frames by broadcast.

Thus, by containing the reference clock information in the TLV packet positioned at a head within the transfer slot, the reception apparatus may specify the position of the reference clock information in advance. Therefore, the reception apparatus may reduce (simplify) processes for acquiring the reference clock information. Here, an example of the first transfer unit is a TLV packet. An example of the second transfer unit is a slot, and an example of the transfer frame is a transfer slot.

In addition, each of the first transfer units may be a variable-length transfer unit, and each of the second transfer units may be a fixed-length transfer unit.

In addition, each of the first transfer units positioned at a head within each of the frames may store the IP packets that do not undergo header compression.

Thus, by prescribing presence of header compression of the IP packets on the transmission side, the reception side may specify the position of the reference clock information in more detail. Therefore, the process by which the reception apparatus acquires the reference clock information may be simplified.

In addition, the one or more first transfer units may be one or more TLV (Type Length Value) packets, the one or more second transfer units may be one or more slots under an advanced BS transfer scheme, and the one or more frames may be one or more transfer slots under the advanced BS transfer scheme.

In addition, the reference clock information may be an NTP (Network Time Protocol).

In addition, the one or more frames may be transmitted in a predetermined transmission cycle by broadcast.

A reception method according to one aspect of the present disclosure includes: receiving one or more frames for content transfer, the one or more frames being transmitted by broadcast and containing reference clock information at a head, each of the frames containing one or more second transfer units, each of the second transfer units being placed at a head within each of the frames and containing one or more first transfer units, each of the first transfer units containing one or more Internet Protocol (IP) packets, the reference clock information being contained in each of the first transfer units positioned at a head within each of the frames; extracting the reference clock information from the one or more frames; and generating a clock used for reproduction of the content that uses the IP packets by using the reference clock information.

A transmission apparatus according to one aspect of the present disclosure includes: generation circuitry which, in operation, generates one or more frames for content transfer, each of the frames containing one or more second transfer units, each of the second transfer units containing one or more first transfer units, each of the first transfer units containing one or more Internet Protocol (IP) packets, each of the first transfer units positioned at a head within each of the frames among the one or more first transfer units containing reference clock information indicating time used for reproduction of the content that uses the IP packets in a reception apparatus; and transmission circuitry which, in operation, transmits the one or more frames by broadcast.

A reception apparatus according to one aspect of the present disclosure includes: reception circuitry which, in operation, receives one or more frames for content transfer, the one or more frames being transmitted by broadcast and containing reference clock information at a head, each of the frames containing one or more second transfer units, each of the second transfer units being placed at a head within each of the frames and containing one or more first transfer units, each of the first transfer units containing one or more Internet Protocol (IP) packets, the reference clock information being contained in each of the first transfer units positioned at a head within each of the frames; extraction circuitry which, in operation, extracts the reference clock information from the one or more frames; and generation circuitry which, in operation, generates a clock used for reproduction of the content that uses the IP packets by using the reference clock information.

Note that these general or specific aspects may be implemented using a system, an apparatus, a method, an integrated circuit, a computer program, or a computer-readable recording medium such as a CD-ROM. Also, these general or specific aspects may be implemented using an arbitrary combination of a system, an apparatus, a method, an integrated circuit, a computer program, and a recording medium.

First Exemplary Embodiment

[Basic Configuration of an MMT Scheme]

First, a basic configuration of an MMT scheme will be described. FIG. 1 illustrates a protocol stack diagram for performing transfer using the MMT scheme and an advanced BS transfer scheme.

Under the MMT scheme, information such as video and audio is stored in a plurality MPUs (Media Presentation Units) and a plurality of MFUs (Media Fragment Units), and an MMT packet header is added for MMT-packetization.

Meanwhile, under the MMT scheme, the MMT packet header is also added to control information such as an MMT message for MMT-packetization. The MMT packet header is provided with a field that stores a 32-bit short-format NTP, and this field may be used for QoS control of communication networks, etc.

MMT-packetized data is encapsulated into an IP packet having a UDP header or IP header. At this time, in the IP header or UDP header, when a set of packets with an identical source IP address, destination IP address, source port number, destination port number, and protocol classification is an IP data flow, headers of a plurality of IP packets contained in one IP data flow are redundant. Therefore, header compression of some IP packets is performed in one IP data flow.

Figure 2:
FIG. 2 is a diagram illustrating data structure of a TLV packet.

Next, a TLV packet will be described in detail. FIG. 2 is a diagram illustrating data structure of the TLV packet.

The TLV packet stores an IPv4 packet, IPv6 packet, compressed IP packet, NULL packet, and transfer control signal, as illustrated in FIG. 2. These pieces of information are identified using an 8-bit data type. Examples of the transfer control signal include an AMT (Address Map Table) and NIT (Network Information Table). Also, in the TLV packet, a data length (byte unit) is indicated using a 16-bit field, and a value of data is stored after the data length. Since there is 1-byte header information before the data type (not illustrated in FIG. 2), the TLV packet has a total of 4-byte header area.

The TLV packet is mapped to a transfer slot under the advanced BS transfer scheme. Pointer/slot information that indicates a head position of a first packet and a tail position of a last packet which are contained in every slot are stored in TMCC (Transmission and Multiplexing Configuration Control) control information.

Figure 3:
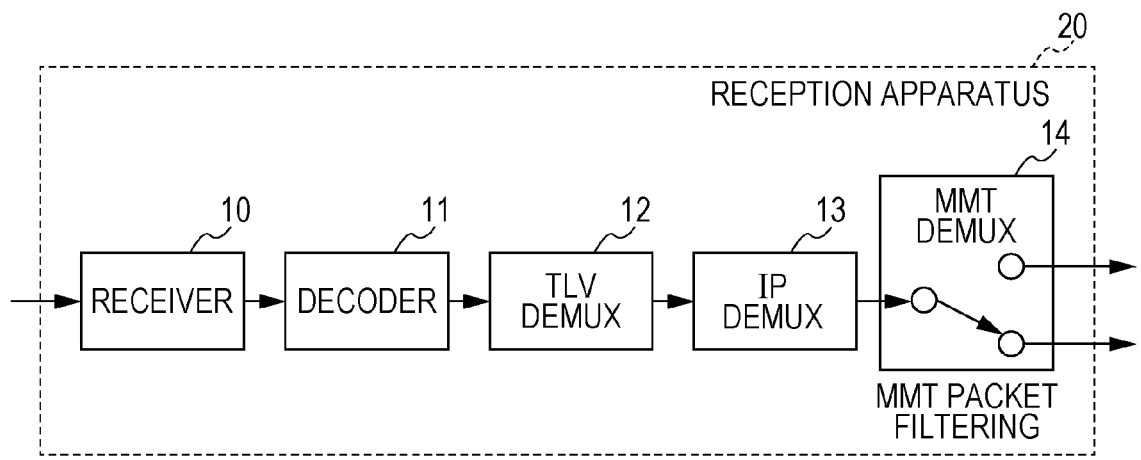
FIG. 3 is a block diagram illustrating a basic configuration of a reception apparatus.

Next, a configuration of a reception apparatus when the MMT packet is transferred by using the advanced BS transfer scheme will be described. FIG. 3 is a block diagram illustrating the basic configuration of the reception apparatus. Note that the configuration of the reception apparatus of FIG. 3 is simplified. More specific configuration will be described later individually according to a manner in which reference clock information is stored.

Reception apparatus 20 includes receiver 10, decoder 11, TLV demultiplexer (DEMUX) 12, IP demultiplexer (DEMUX) 13, and MMT demultiplexer (DEMUX) 14.

Receiver 10 receives transfer channel coded data.

Decoder 11 decodes the transfer channel coded data received by receiver 10, applies error correction and the like, and extracts a TMCC control signal and TLV data. The TLV data extracted by decoder 11 undergoes DEMUX processing by TLV demultiplexer 12.

The DEMUX process performed by TLV demultiplexer 12 differs according to the data type. For example, when the data type is a compressed IP packet, TLV demultiplexer 12 performs processes such as decompressing the compressed header and passing the header to an IP layer.

IP demultiplexer 13 performs processes such as header analysis of the IP packet or UDP packet, and extracts the MMT packet from each IP data flow.

MMT demultiplexer 14 performs a filtering process (MMT packet filtering) based on a packet ID stored in the MMT packet header.

[Method for Storing the Reference Clock Information in the MMT Packet]

Under the MMT scheme described with reference to FIG. 1 to FIG. 3 described above, although the 32-bit short-format NTP may be stored in the MMT packet header and transferred, there exists no method for transferring a long-format NTP.

Hereinafter, a method for storing the reference clock information in the MMT packet will be described. First, the method for storing the reference clock information within the MMT packet will be described.

When a descriptor, a table, or a message for storing the reference clock information is defined and stored in the MMT packet as control information, an identifier indicating that the control information is the descriptor, table, or message indicating the reference clock information is indicated within the control information. Then, the control information is stored in the MMT packet on a transmission side.

This allows reception apparatus 20 to identify the reference clock information based on the identifier. Note that the reference clock information may be stored in the MMT packet by using existing descriptors (for example, CRI_descriptor( ), etc.).

Next, a method for storing the reference clock information in the MMT packet header will be described.

For example, there is a method for storing the reference clock information by using a header_extension field (hereinafter referred to as an extension field). The extension field becomes effective when an extension_flag of the MMT packet header is set to "1".

There is a method for storing, in the extension field, an extension field type indicating data classification of data to be stored in the extension field, for storing information indicating that the data is the reference clock information (for example, a 64-bit long-format NTP) in the extension field type, and for storing the reference clock information in the extension field.

In this case, when the header_extension_flag of the MMT packet header is '1', reception apparatus 20 refers to the extension field of the MMT packet. When the extension field type indicates that the data is the reference clock information, the reference clock information is extracted and a clock is reproduced.

Note that the reference clock information may be stored in an existing header field. In addition, when there is an unused field or when there is a field unnecessary for broadcast, the reference clock information may be stored in these fields.

In addition, the reference clock information may be stored by using the existing field and the extension field together. For example, the existing 32-bit short-format NTP field and the extension field may be used together.

In order to maintain compatibility with the existing field, of the 64-bit long-format NTP, only a 32-bit section corresponding to a short-format format may be stored in the existing field, and remaining 32 bits may be stored in the extension field.

Here, the reference clock information is, for example, time when a head bit of the MMT packet in which the reference clock information is stored passes a predetermined position (for example, when the head bit is output from a specific component of a transmission apparatus). However, the reference clock information may be time when a bit of another position passes the predetermined position.

When the reference clock information is stored in the MMT packet as the control information, the MMT packet containing the control information is transmitted at predetermined transmission intervals.

When the reference clock information is stored in the extension field of the MMT packet, the reference clock information is stored in the predetermined extension field of the MMT packet header. Specifically, for example, at least one or more pieces of the reference clock information are stored in the header extension field of the MMT packet at intervals of 100 ms.

Note that, when the reference clock information is stored in the MMT packet, the packet ID of the MMT packet that stores the reference clock information is stored in program information. Reception apparatus 20 analyzes the program information and acquires the MMT packet in which the reference clock information is stored. At this time, the packet ID of the MMT packet in which the reference clock information is stored may be prescribed in advance as a fixed value. This allows reception apparatus 20 to acquire the reference clock information without analyzing the program information.

[Operation Flow when the Reference Clock Information is Stored in the MMT Packet]

Next, an operation flow when the reference clock information is stored in the MMT packet (acquisition flow of the reference clock information) will be described.

Figure 4:
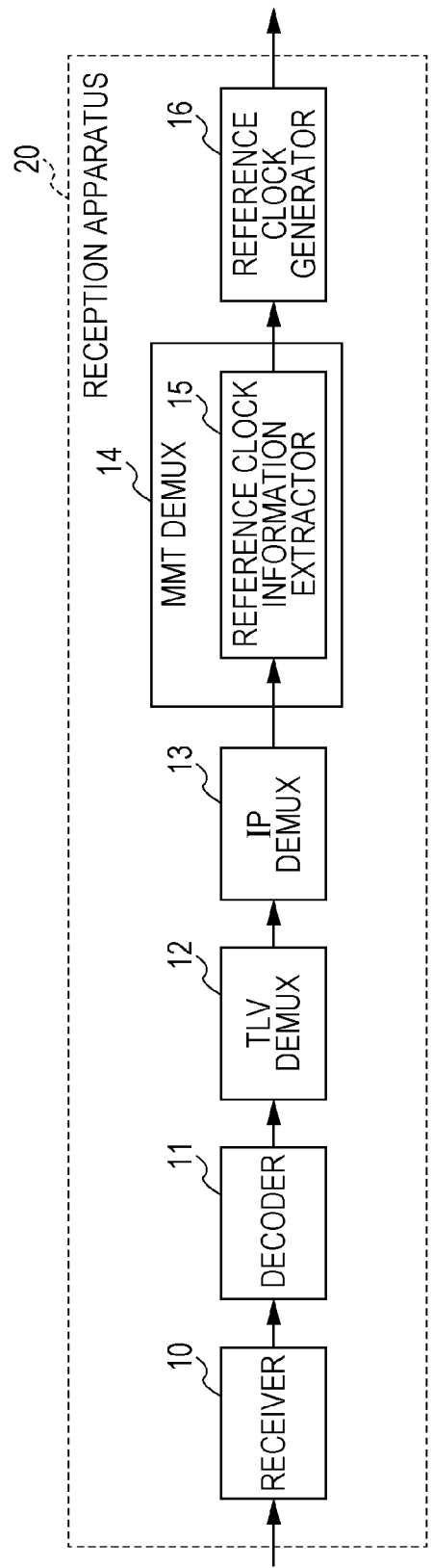
FIG. 4 is a block diagram illustrating a functional configuration of the reception apparatus when reference clock information is stored in an extension field of a MMT packet header.
Figure 5:
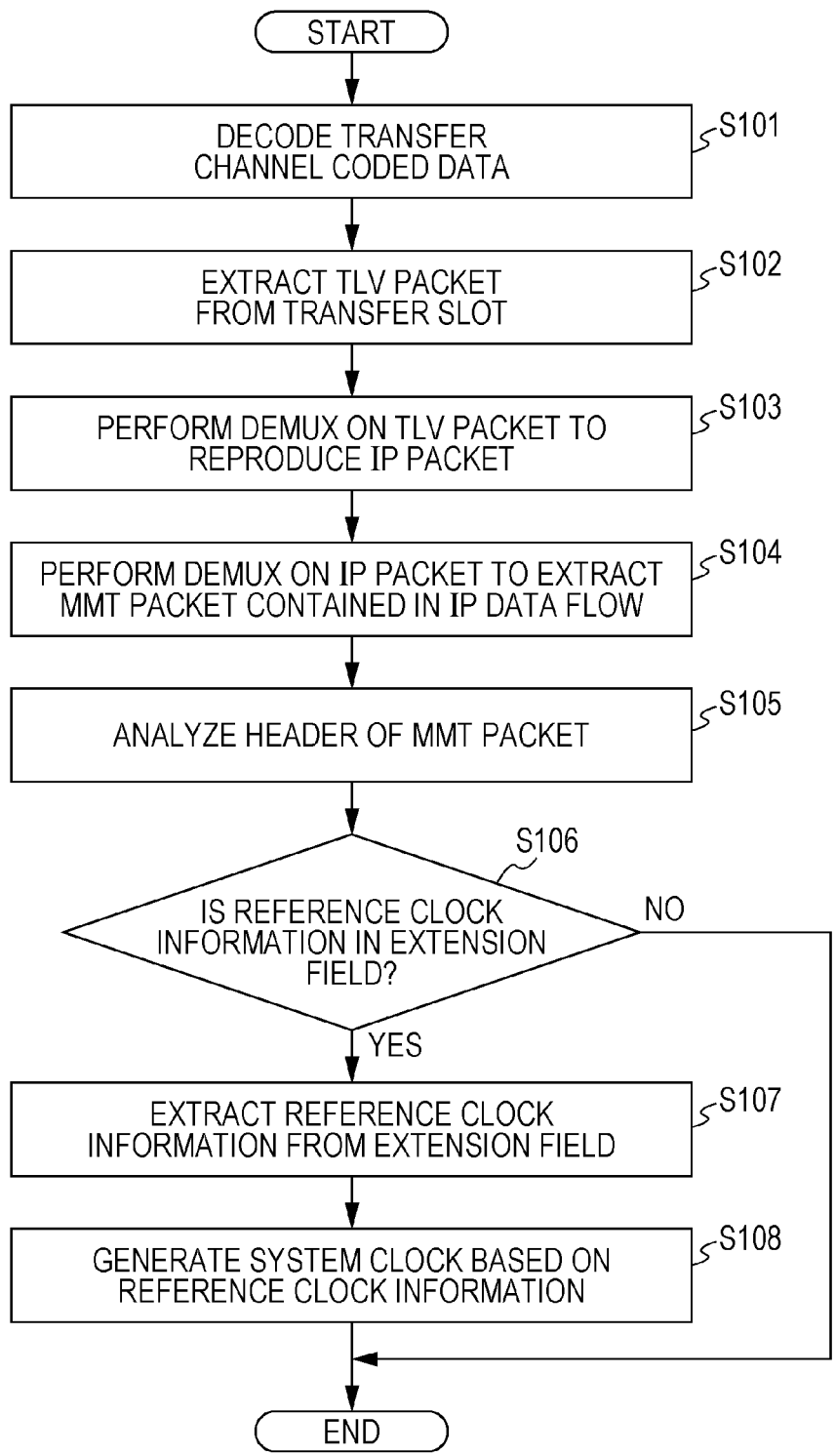
FIG. 5 is a diagram illustrating an acquisition flow of the reference clock information performed by the reception apparatus when the reference clock information is stored in the extension field of the MMT packet header.

First, the acquisition flow of the reference clock information by reception apparatus 20 when the reference clock information is stored in the extension field of the MMT packet header will be described. FIG. 4 is a block diagram illustrating a functional configuration of reception apparatus 20 when the reference clock information is stored in the extension field of the MMT packet header. FIG. 5 is a diagram illustrating the acquisition flow of the reference clock information performed by reception apparatus 20 when the reference clock information is stored in the extension field of the MMT packet header.

As illustrated in FIG. 4, when the reference clock information is stored in the extension field of the MMT packet header, reference clock information extractor 15 (an example of the extractor) is provided within MMT demultiplexer 14, and reference clock generator 16 (an example of the generator) is provided downstream of MMT demultiplexer 14.

In the flow of FIG. 5, decoder 11 of reception apparatus 20 decodes the transfer channel coded data received by receiver 10 (S101), and extracts the TLV packet from the transfer slot (S102).

Next, TLV demultiplexer 12 performs DEMUX on the extracted TLV packet to extract the IP packet (S103). At this time, the header of the compressed IP packet is reproduced.

Next, IP demultiplexer 13 performs DEMUX on the IP packet, acquires the specified IP data flow, and extracts the MMT packet (S104).

Next, MMT demultiplexer 14 analyzes the header of the MMT packet, and determines whether the extension field is used and whether the reference clock information is in the extension field (S106). When there is no reference clock information in the extension field (No in S106), the process ends.

On the other hand, when the determination is made that the reference clock information is in the extension field (Yes in S106), reference clock information extractor 15 extracts the reference clock information from the extension field (S107). Then, reference clock generator 16 generates the system clock based on the extracted reference clock information (S108). The system clock is, in other words, a clock for reproducing content.

Figure 6:
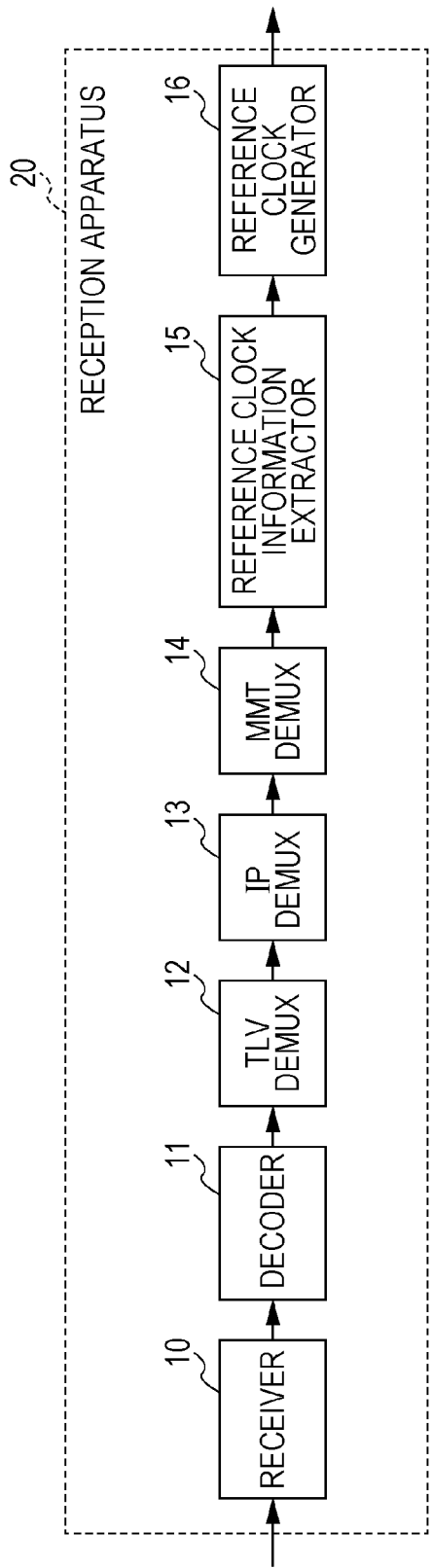
FIG. 6 is a block diagram illustrating the functional configuration of the reception apparatus when the reference clock information is stored in control information.
Figure 7:
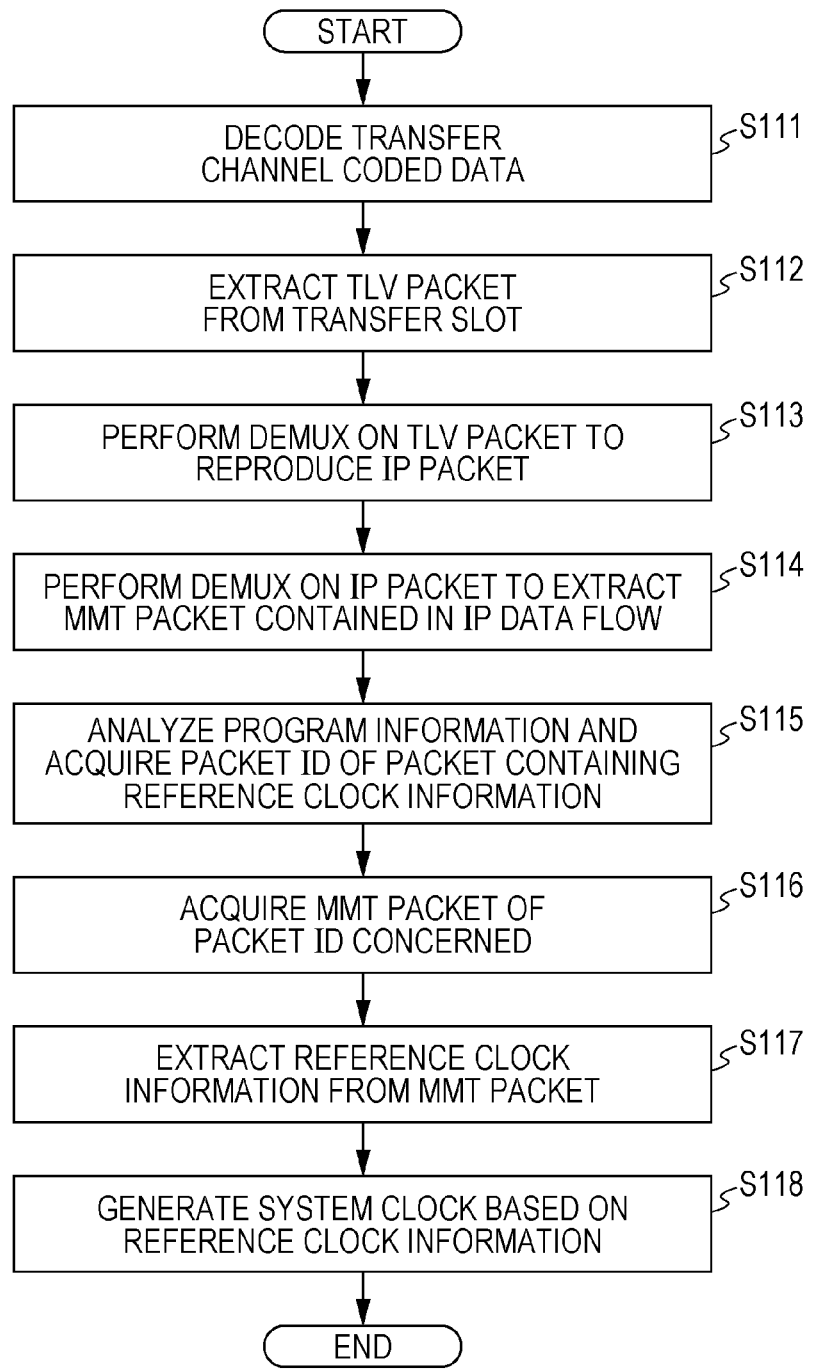
FIG. 7 is a diagram illustrating the acquisition flow of the reference clock information performed by the reception apparatus when the reference clock information is stored in the control information.

Next, the acquisition flow of the reference clock information by reception apparatus 20 when the reference clock information is stored in the control information will be described. FIG. 6 is a block diagram illustrating the functional configuration of reception apparatus 20 when the reference clock information is stored in the control information. FIG. 7 is a diagram illustrating the acquisition flow of the reference clock information performed by reception apparatus 20 when the reference clock information is stored in the control information.

As illustrated in FIG. 6, when the reference clock information is stored in the control information, reference clock information extractor 15 is disposed downstream of MMT demultiplexer 14.

In the flow of FIG. 7, the processes of step S111 to step S114 are identical to the flow of step S101 to step S104 described in FIG. 5.

Subsequent to step S114, MMT demultiplexer 14 acquires the packet ID of the packet containing the reference clock information from the program information (S115), and acquires the MMT packet of the packet ID (S116). Subsequently, reference clock information extractor 15 extracts the reference clock information from the control signal contained in the extracted MMT packet (S117), and reference clock generator 16 generates the system clock based on the extracted reference clock information (S118).

[Method for Storing the Reference Clock Information in the TLV Packet]

As described in FIG. 5 and FIG. 7, when the reference clock information is stored in the MMT packet, in order to obtain the reference clock information on the reception side, reception apparatus 20 extracts the TLV packet from the transfer slot, and extracts the IP packet from the TLV packet. Furthermore, reception apparatus 20 extracts the MMT packet from the IP packet, and further extracts the reference clock information from the header or a payload of the MMT packet. Thus, when the reference clock information is stored in the MMT packet, measures need to be taken against many processes required for acquiring the reference clock information, and long time required until the acquisition.

Therefore, a method will be described for implementing a process of adding a time stamp to a medium, such as video and audio, based on the reference clock, and a process of transferring the medium by using the MMT scheme, and for performing transfer of the reference clock information by using a lower layer, lower protocol, or lower multiplexing scheme than the MMT layer.

Figure 8:
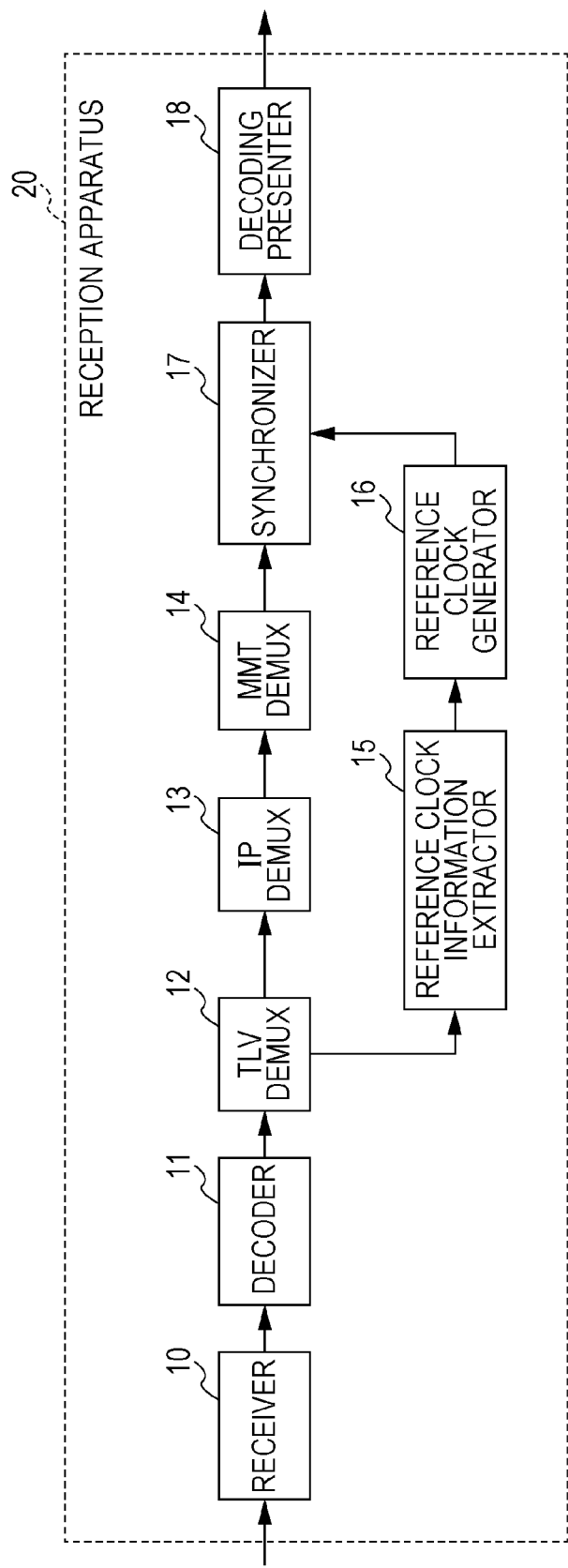
FIG. 8 is a block diagram illustrating the configuration of the reception apparatus when the reference clock information is stored in the TLV packet.

First, a method for storing the reference clock information in the TLV packet for transfer will be described. FIG. 8 is a block diagram illustrating the configuration of reception apparatus 20 when the reference clock information is stored in the TLV packet.

Reception apparatus 20 illustrated in FIG. 8 differs from reception apparatus 20 of FIG. 4 and FIG. 6 in placement of reference clock information extractor 15 and reference clock generator 16. In addition, synchronizer 17 and decoding presenter 18 are also illustrated in FIG. 8.

The TLV packet includes the 8-bit data type, 16-bit data length, and 8*N-bit data, as illustrated in aforementioned FIG. 2. In addition, 1-byte header which is not illustrated in FIG. 2 exists before the data type, as described above. Here, the data type is specifically prescribed, for example, as 0x01: IPv4 packet, 0x03: header-compressed IP packet, etc.

In order to store new data in the TLV packet, an undefined area of the data type is used to prescribe the data type. In order to indicate that the reference clock information is stored in the TLV packet, the data type describes that the data is the reference clock information.

Figure 9:
FIG. 9 is a diagram illustrating an example in which a long-format NTP is stored in the TLV packet.

Note that the data type may be prescribed for each kind of the reference clock. For example, the data types that indicate the short-format NTP, long-format NTP, and PCR (Program Clock Reference) may be prescribed individually. FIG. 9 is a diagram illustrating an example in which the long-format NTP is stored in the TLV packet. The long-format NTP is stored in a data field.

In this case, reference clock information extractor 15 analyzes the data type of TLV packet. When the reference clock information is stored, reference clock information extractor 15 analyzes the data length, and extracts the reference clock information from the data field.

Here, when the data length is uniquely determined by the data type, reference clock information extractor 15 may acquire the reference clock information without analyzing a data length field. For example, when the data type indicates a 64-bit long format NTP, reference clock information extractor 15 may extract a section from 4 bytes+first bit to 4 bytes+64-th bit. Also, reference clock information extractor 15 may extract only a desired bit from 64-bit data.

Figure 10:
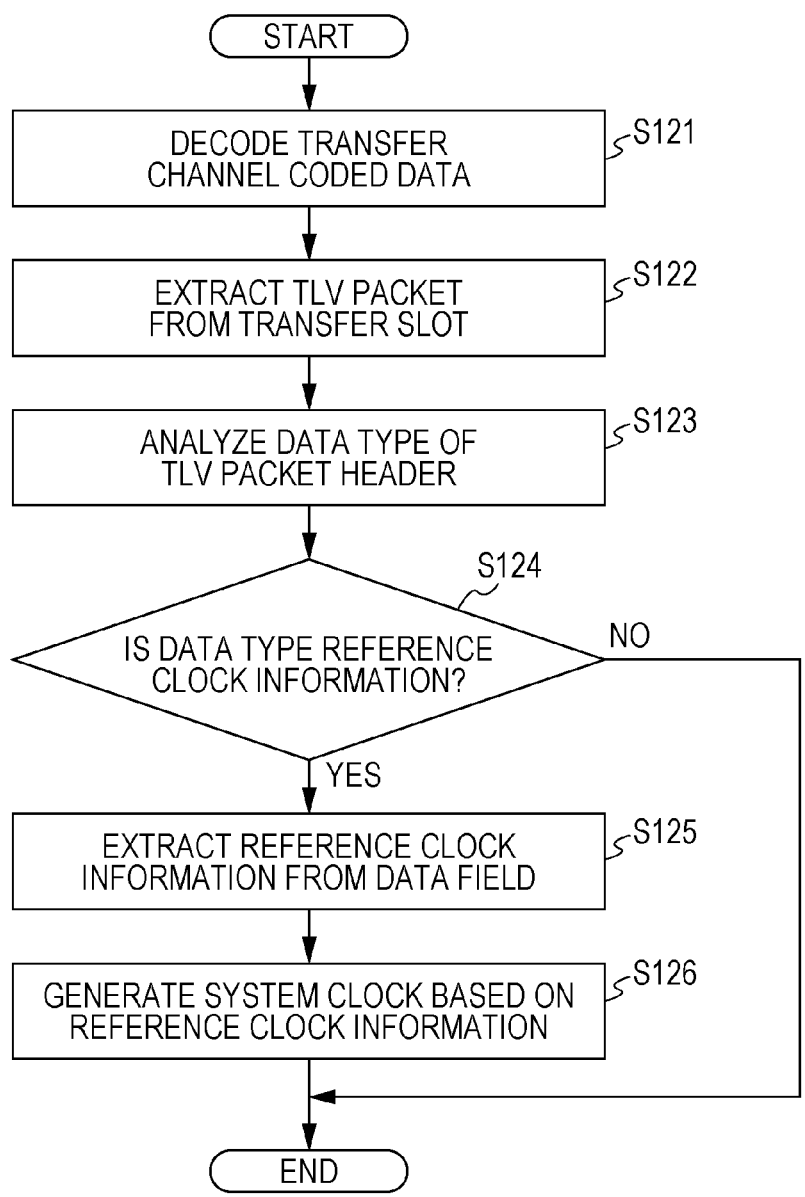
FIG. 10 is a diagram illustrating the acquisition flow of the reference clock information performed by the reception apparatus when the reference clock information is stored in the TLV packet.

Next, the operation flow of reception apparatus 20 when the reference clock information is stored in the TLV packet (acquisition flow of the reference clock information) will be described with reference to FIG. 10. FIG. 10 is a diagram illustrating the acquisition flow of the reference clock information performed by reception apparatus 20 when the reference clock information is stored in the TLV packet.

In the flow of FIG. 10, first, decoder 11 decodes the transfer channel coded data received by receiver 10 (S121), and extracts the TLV packet from the transfer slot (S122).

Next, TLV demultiplexer 12 analyzes the data type of TLV packet (S123), and determines whether the data type is the reference clock information (S124). When the data type is the reference clock (Yes in S124), reference clock information extractor 15 extracts the reference clock information from the data field of the TLV packet (S125). Then, reference clock generator 16 generates the system clock based on the reference clock information (S126). On the other hand, when the data type is not the reference clock information, (No in S124), the acquisition flow of the reference clock information ends.

In addition, in an unillustrated flow, IP demultiplexer 13 extracts the IP packet according to the data type. Then, the IP DEMUX process and MMT DEMUX process are performed on the extracted IP packet, and the MMT packet is extracted. Furthermore, synchronizer 17 outputs video data to decoding presenter 18 with timing with which the time stamp of the video data contained in the extracted MMT packet coincides with the reference clock generated in step S126. Decoding presenter 18 decodes and presents the video data.

In a transmission method described above, the type data of the TLV packet indicates that the reference clock information is stored, and the reference clock information is stored in the data field of the TLV packet. Thus, by storing and transmitting the reference clock information by using a lower layer or lower protocol than the MMT layer, the processes and time until reception apparatus 20 extracts the reference clock information may be reduced.

Also, since the reference clock information may be extracted and reproduced in a lower layer extending over the IP layer, the reference clock information may be extracted by hardware implementation. This may reduce more influence of jitter or the like than extracting the reference clock information by software implementation, and makes it possible to generate higher-precision reference clock.

Next, other methods for storing the reference clock information will be described.

When the data length is uniquely determined according to the data type in the aforementioned flow of FIG. 10, the data length field does not need to be transmitted. Here, when the data length field is not transmitted, an identifier is stored indicating that the data length field is data that is not transmitted.

Although the reference clock information is stored in the data field of the TLV packet according to the description of FIG. 10, the reference clock information may be appended immediately before or after the TLV packet. Also, the reference clock information may be appended immediately before or after data to be stored in the TLV packet. In these cases, a data type that allows specification of a position where the reference clock information is appended is added.

Figure 11:
FIG. 11 is a diagram illustrating structure in which the reference clock information is appended immediately before an IP packet header.

For example, FIG. 11 is a diagram illustrating structure in which the reference clock information is appended immediately before the IP packet header. In this case, the data type indicates that the data is an IP packet with reference clock information. When the data type indicates the IP packet with reference clock information, reception apparatus 20 (reference clock information extractor 15) may acquire the reference clock information by extracting bits of a previously prescribed predetermined length of the reference clock information from a head of the data field of the TLV packet. At this time, the data length may specify the length of the data including the length of the reference clock information, and may specify the length that does not include the length of the reference clock information.

Figure 12:
FIG. 12 is a diagram illustrating structure in which the reference clock information is appended immediately before the TLV packet.

In addition, FIG. 12 is a diagram illustrating structure in which the reference clock information is appended immediately before the TLV packet. In this case, the data type is a conventional data type. An identifier indicating that the TLV packet is a TLV packet with reference clock information is stored, for example, in a slot header of the transfer slot or the TMCC control information. FIG. 13 is a diagram illustrating structure of the transfer slot, and FIG. 14 is a diagram illustrating structure of the slot header of the transfer slot.

As illustrated in FIG. 13, the transfer slot includes a plurality of slots (120 slots of Slot #1 to Slot #120 in the example of FIG. 13). The number of bits contained in each slot is a fixed bit number uniquely determined based on a coding rate of error correction, has a slot header, and one or more TLV packets are stored. Note that, as illustrated in FIG. 13, the TLV packet is variable-length.

As illustrated in FIG. 14, in a head TLV instruction field (16 bits) of the slot header is stored a position of a head byte of a first TLV packet within the slot indicated with the number of bytes from a slot head except the slot header. Remaining 160 bits of the slot header is undefined.

When the identifier indicating that the TLV packet is a TLV packet with reference clock information is stored in the slot header, for example, information that allows specification of a position of the TLV packet with reference clock information within the slot, kind of the reference clock information, data length, and the like are stored by extending (using) an undefined field of the slot header.

In addition, when the identifier indicating that the TLV packet is a TLV packet with reference clock information is stored in the TMCC control information, information on whether the reference clock information is contained in the slot may be stored in the TMCC control information. As a data classification to be stored within the slot, a data classification indicating that the TLV packet is a TLV packet with reference clock information may be defined.

Also, an area into which the reference clock information is stored may be newly defined in the undefined field of the slot header.

Also, the reference clock information may be stored in a previously determined slot, and information indicating that the reference clock information is contained may be stored within the slot header. Here, the previously determined slot is, for example, a head slot of the transfer slot (Slot #1 in the example of FIG. 13), and the reference clock information stored in the IP packet may be contained in the head TLV packet within this slot.

Figure 15:
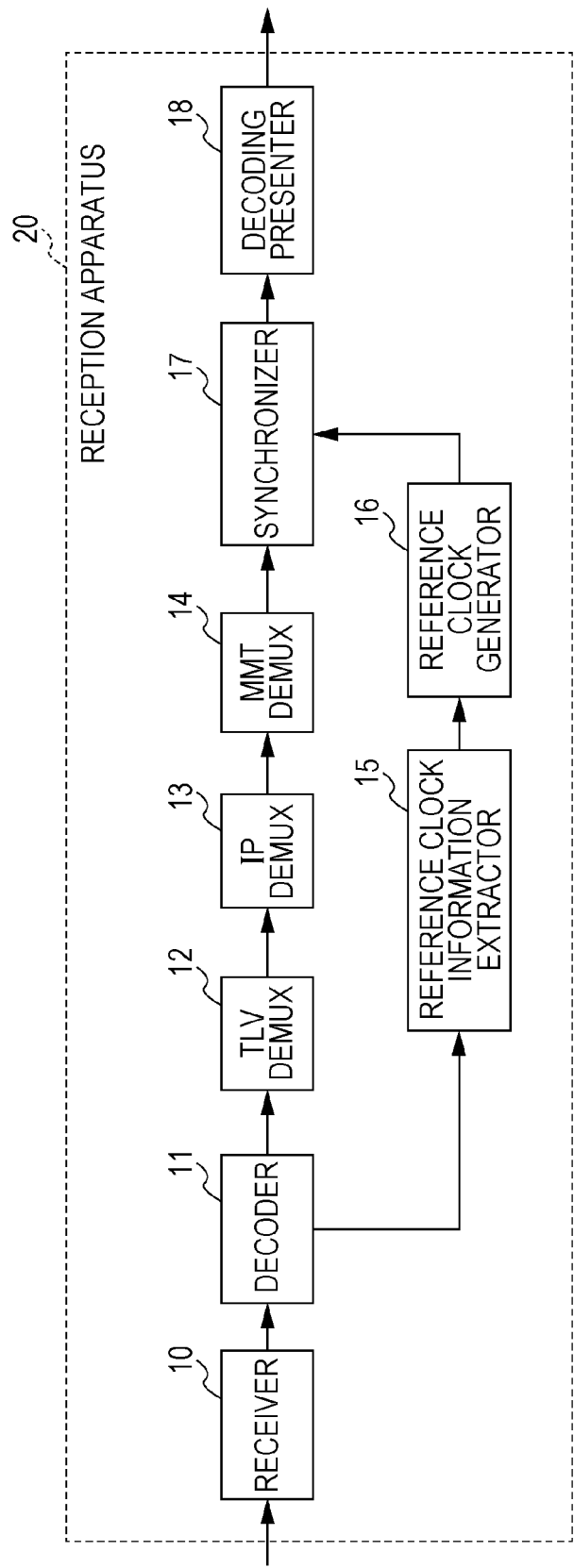
FIG. 15 is a block diagram illustrating the functional configuration of the reception apparatus when information indicating that the reference clock information is contained within the slot header is stored in TMCC control information.
Figure 16:
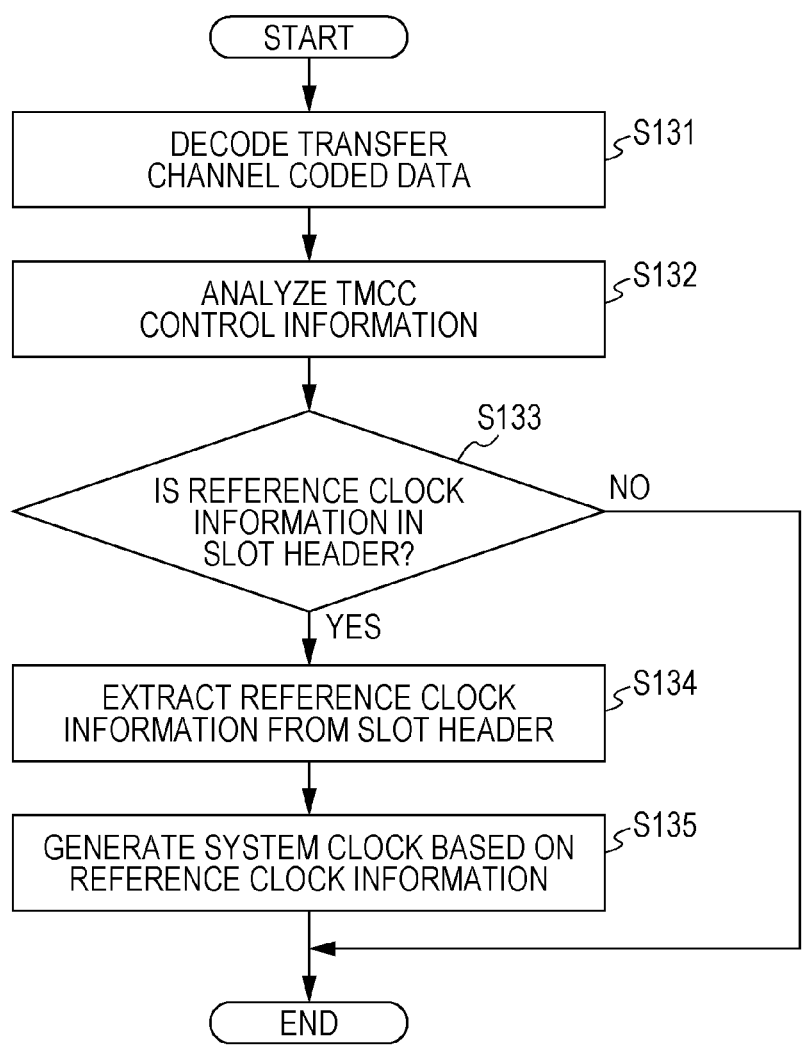
FIG. 16 is a diagram illustrating the acquisition flow of the reference clock information when the information indicating that the reference clock information is contained in the slot header is stored in the TMCC control information.

Also, information indicating that the reference clock information is contained may be stored in the TMCC control information. FIG. 15 is a block diagram illustrating the functional configuration of reception apparatus 20 when the information indicating that the reference clock information is contained within the slot header is stored in the TMCC control information. FIG. 16 is a diagram illustrating the acquisition flow of the reference clock information when the information indicating that the reference clock information is contained in the slot header is stored in the TMCC control information.

As illustrated in FIG. 15, in reception apparatus 20 when the information indicating that the reference clock information is contained within the slot header is stored in the TMCC control information, reference clock information extractor 15 acquires the reference clock signal from the transfer slot that is output from decoder 11.

In the flow of FIG. 16, decoder 11 decodes the transfer channel coded data (S131), analyzes the TMCC control signal (S132), and determines whether the reference clock information is in the slot header within the transfer slot (S133). When the reference clock information is in the slot header (Yes in S133), reference clock information extractor 15 extracts the reference clock information from the slot header (S134), and reference clock generator 16 generates the reference clock of the system (system clock) based on the reference clock information (S135). On the other hand, when the reference clock information is not in the slot header (No in S133), the acquisition flow of the reference clock information ends.

Such reception apparatus 20, which may acquire the reference clock information in the layer of the transfer slot, may acquire the reference clock information more quickly than a case where the reference clock information is stored in the TLV packet.

As described above, by storing the reference clock information in the TLV packet or transfer slot, reception apparatus 20 may reduce the processes until the acquisition of the reference clock information, and may shorten acquisition time of the reference clock information.

In addition, by storing the reference clock information in a physical layer in this way, acquisition and reproduction of the reference clock information by hardware may be implemented easily, and clock reproduction with higher-precision is possible than acquisition and reproduction of the reference clock information by software.

In addition, the aforementioned transmission method according to the first exemplary embodiment is summarized as, in the system in which the plurality of layers (protocols) exists including the IP layer, the time stamp of a medium is added based on the reference clock information in the layers upper than the IP layer, and the reference clock information is transmitted in the layers lower than the IP layer. Such a configuration facilitates processing of the reference clock information by hardware in reception apparatus 20.

Note that, based on a similar idea, storing the reference clock information within the IP packet in a condition of not being stored in the MMT packet may also be considered. Even in such a case, the processes for acquiring the reference clock information may be reduced as compared with the case where the reference clock information is stored in the MMT packet.

[Transmission Cycle of the Reference Clock Information]

Hereinafter, a transmission cycle of the reference clock information will be supplemented.

In the case of storing the reference clock information in the TLV packet, for example, time when the head bit of the TLV packet is transmitted on the transmission side is stored as the reference clock information. In addition, not the transmission time of the head bit but predetermined time determined differently may be stored as the reference clock information.

The TLV packet containing the reference clock information is transmitted at predetermined intervals. In other words, the TLV packet containing the reference clock information is contained in the transfer slot and is transmitted in a predetermined transmission cycle. For example, at least one or more pieces of reference clock information in 100 ms may be stored in the TLV packet and be transferred.

In addition, the TLV packet containing the reference clock information may be placed at predetermined intervals at a predetermined position of the transfer slot under the advanced BS transfer scheme. In addition, the TLV packet containing the reference clock information may be stored once every 5-slot unit which is a slot assignment unit of the TLV packet, and the reference clock information may be stored in the head TLV packet of the first slot of the 5-slot unit. That is, the TLV packet containing the reference clock information may be placed at a head within the head slot within the transfer slot (that is, immediately after the slot header).

In addition, the transmission cycle and transmission interval of the reference clock information may be changed according to a modulation scheme or coding rate of the transfer channel coding scheme.

[Method for Acquiring the Reference Clock Information in the Upper Layer Quickly]

Next, a method will be described for shorten time to the acquisition of the reference clock information by performing batch DEMUX processing from the lower layer to the upper layer in reception apparatus 20.

Here, a method will be described for storing the reference clock information in the upper layer such as the MMT packet, and for storing in the IP packet the MMT packet in which the reference clock information is stored. In the method described below, direct reference of the MMT packet which is the upper layer is made from the lower layer such as the TLV packet, by defining a protocol for storing in the TLV packet the IP packet in which the reference clock information is stored. The reference clock information contained in the MMT packet is acquired without performance of normal DEMUX processing.

On the transmission side, the reference clock information is contained in the aforementioned control information stored in the MMT packet. The previously determined packet ID is added to the control information containing the reference clock information. Then, on the transmission side, the MMT packet containing the reference clock information is stored in a dedicated IP data flow. The previously determined source IP address, destination IP address, source port number, destination port number, and protocol classification are added.

On receipt of the transfer channel coded data generated in this way, reception apparatus 20 may extract the IP packet containing the reference clock information by TLV demultiplexer 12 acquiring the previously determined IP data flow.

Note that when the IP packet undergoes header compression, for example, an identifier indicating that the IP packet contains the reference clock information is added to a context identifier indicating identical IP data flows. The context identifier is stored in a compressed IP packet header. In this case, reception apparatus 20 may extract the IP packet containing the reference clock information with reference to the context identifier in the compressed IP packet header.

In addition, the IP packet containing the reference clock information may be prescribed not to undergo the header compression, and may be prescribed to always undergo the header compression. It may be prescribed that the previously determined context identifier may be added to the IP packet containing the reference clock information, and that all the headers are compressed.

In addition, a method may also be considered for defining, in a TLV data type field, an identifier indicating that the TLV packet is an IP packet that belongs to the IP data flow containing the reference clock information, or an identifier indicating that the TLV packet is a compressed IP packet that belongs to the IP data flow containing the reference clock information. The following describes the method.

Reception apparatus 20 determines the TLV data type. On determination that the reference clock information is contained, reception apparatus 20 acquires the reference clock information contained within the MMT packet directly from the IP packet.

Thus, reception apparatus 20 may extract the reference clock information contained in the MMT packet by extracting a bit string at a specific position from the IP packet or compressed IP packet, without analyzing the IP address, port number, or context identifier. Extracting the bit string at a specific position means, for example, extracting information of a specific length from a position that is offset by fixed-length bytes from the TLV packet header. Accordingly, the reference clock information is acquired.

The offset length of the fixed-length bytes for extracting the reference clock information is uniquely determined for each of the IP packet and the compressed IP packet. Therefore, reception apparatus 20 may acquire the reference clock information by extracting the information of the specific length from the position that is offset by the fixed-length bytes immediately after determining the TLV data type.

Note that the aforementioned method is one example, and the reference clock information in the upper layer may be acquired from the lower layer by defining another protocol or identifier. For example, an identifier indicating whether the IP packet contains the reference clock information may be stored in a field other than the TLV data type field.

Figure 17:
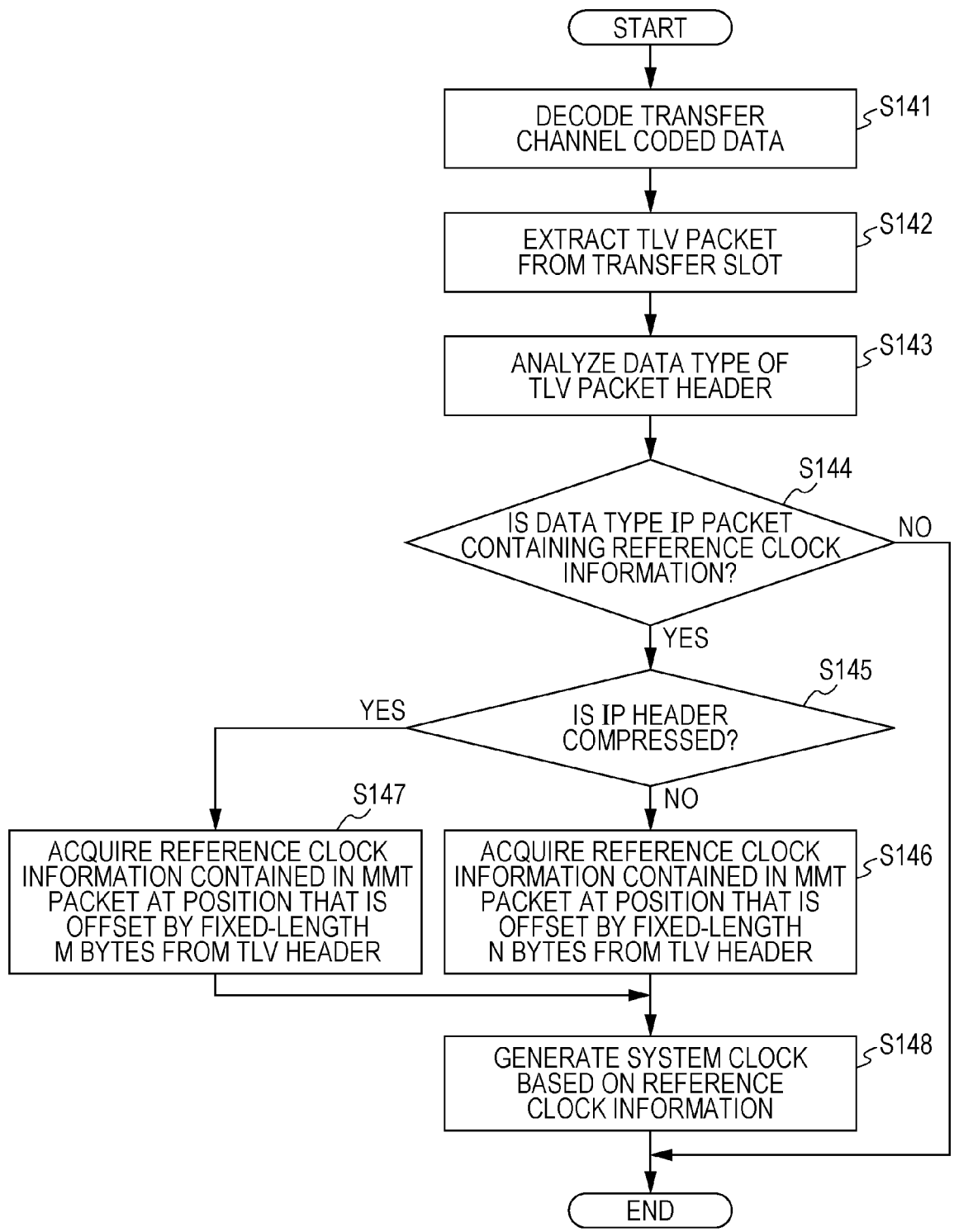
FIG. 17 is a diagram illustrating a flow of extracting a bit string at a specific position from the IP packet or compressed IP packet.

In addition, for example, reference time information contained in the MMT packet may be extracted by extracting the bit string of a specific position from the IP packet or compressed IP packet without analyzing the IP address, the port number, and the context identifier. FIG. 17 is a diagram illustrating a flow for extracting the bit string of a specific position from the IP packet or compressed IP packet. Note that the configuration of reception apparatus 20 in this case is similar to the block diagram illustrated in FIG. 8.

In the flow of FIG. 17, first, decoder 11 decodes the transfer channel coded data received by receiver 10 (S141), and extracts the TLV packet from the transfer channel slot (S142).

Next, TLV demultiplexer 12 analyzes the data type of TLV packet, and determines whether the data type is an IP containing the reference clock information (S144). When the determination is made that the data type is not an IP packet containing the reference clock information (No in S144), the flow ends. When the determination is made that the data type is an IP packet containing the reference clock information (Yes in S144), the IP packet and the MMT packet are analyzed to determine whether the IP header is compressed (S145).

When the IP header is not compressed (No in S145), the reference clock information contained within the MMT packet at a position that is offset by fixed-length N bytes from the TLV header is acquired (S146). When the IP header is compressed (Yes in S145), the reference clock information contained within the MMT packet at a position that is offset by fixed-length M bytes from the TLV header is acquired (S147).

Finally, reference clock generator 16 generates the system clock based on the reference clock information (S148).

Note that, since data structure of the IP packet header differs according to whether the IP packet is IPv4 or IPv6, the fixed-length N bytes and M bytes have different values.

While the normal MMT packet containing audio, video, control signal, and the like undergoes DEMUX processing in normal steps, the MMT packet containing the reference clock information undergoes batch DEMUX processing from the lower layer to the upper layer. This allows acquisition of the reference clock information in the lower layer even when the reference clock information is stored in the upper layer. That is, this may reduce the processes for acquisition of the reference clock information, shorten time to the acquisition of the reference clock information, and facilitate hardware implementation.

Other Exemplary Embodiments

Although the first exemplary embodiment has been described above, the present disclosure is not limited to the aforementioned exemplary embodiment.

Although the storage method of the reference clock information has been described in the aforementioned exemplary embodiment, a plurality of pieces of reference clock information may be transmitted in one or more layers. When the plurality of pieces of reference clock information is transmitted, reception apparatus 20 may select one piece of the reference clock information and use the selected reference clock information for generation of the reference clock (system clock), and may use both pieces of the reference clock information to generate the reference clock. At this time, reception apparatus 20 may select high-precision reference clock information, and may select reference clock information that may be acquired more quickly.

Also, it is assumed that, for example, in addition to the 32-bit short-format NTP contained in the conventional MMT packet header, higher-precision reference clock information is transmitted. In such a case, information for allowing reception apparatus 20 to use the high-precision reference clock information to reproduce the 32-bit short-format NTP is further transmitted from the transmission side. Such information is, for example, time information indicating a relative relationship between clocks, and a configuration, etc. for transmitting the information by using CRI_descriptor( ) etc. may be considered.

Note that, when reception apparatus 20 may reproduce the 32-bit short-format NTP, the conventional NTP field contained in the MMT packet header is unnecessary. Therefore, another piece of information may be stored in the NTP field, and header compression may be performed by reducing the NTP field. When header compression is performed, information indicating that the NTP field is reduced is transmitted. When the NTP field is reduced, reception apparatus 20 generates the reference clock by using another piece of reference clock information, and reproduces the 32-bit short-format NTP.

In addition, when the MMT packet is transferred using a broadband channel, the broadband reception apparatus may use the 32-bit short-format NTP for QoS control, and may not use the reference clock information. Accordingly, the reference clock information does not need to be transmitted through the broadband channel. In addition, when end-to-end delay of the broadband channel is within a certain value, the reference clock information may be used for clock reproduction.

Note that although the aforementioned first exemplary embodiment has described the case where the MMT/IP/TLV scheme is used as an example, schemes other than the MMT scheme may be used as a multiplexing scheme. For example, the present disclosure may also be applied to an MPEG2-TS scheme, RTP scheme, or MPEG-DASH scheme.

In addition, methods for header compression of IP packets include RoHC (Robust Header Compression) and HCfB (Header Compression for Broadcasting).

Schemes for storing IP packets in broadcast include a GSE (Generic Stream Encapsulation) scheme, IPoverTS scheme using ULE (Unidirectional Light-weight. Encapsulation), and the like, in addition to the TLV scheme.

The present disclosure may be applied to a case where any of such schemes is used. Application of the present disclosure allows reception apparatus 20 to achieve shortening of time to the acquisition of the reference clock information and reduction in the processes, and to achieve high precision of the clock by hardware implementation.

Note that the aforementioned reference clock information in the exemplary embodiment is NTP when the multiplexing scheme is MMT, while the reference clock information is PCR (Program Clock Reference) when the multiplexing scheme is, for example, the MPEG2-TS scheme. Also, even when the multiplexing scheme is MMT, PTP prescribed by IEEE1588 may be transferred in an NTP form. Only some bits of NTP may be transferred. That is, the reference clock information may be information indicating time that the transmission side sets. Note that NTP does not necessarily mean an NTP value in an NTP server commonly used on the Internet.

Figure 18:
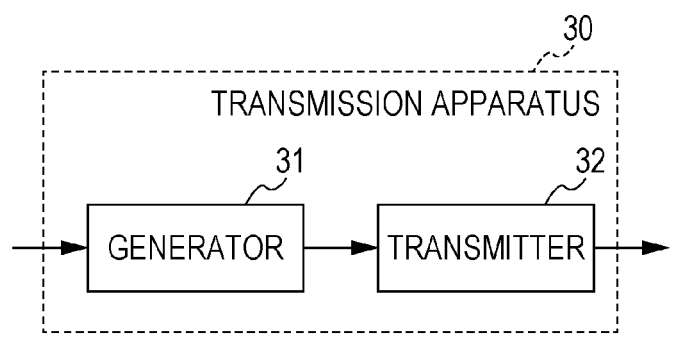
FIG. 18 is a block diagram illustrating a functional configuration of a transmission apparatus.
Figure 19:
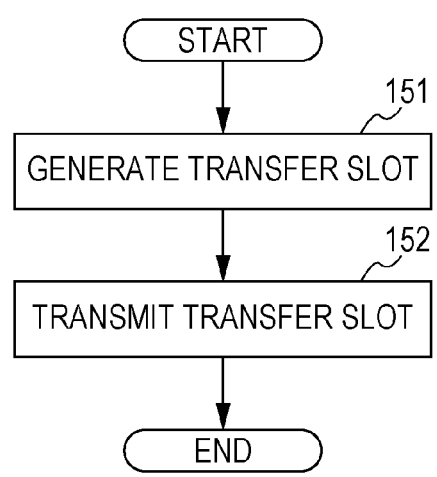
FIG. 19 is a diagram illustrating an operation flow of the transmission apparatus.

In addition, the present disclosure may be implemented as a transmission apparatus (transmission method) that transmits the transfer slot that stores the reference clock information by the above method. The following supplements a configuration of such a transmission apparatus. FIG. 18 is a block diagram illustrating a functional configuration of the transmission apparatus. FIG. 19 is a diagram illustrating an operation flow of the transmission apparatus.

As illustrated in FIG. 18, transmission apparatus 30 includes generator 31 and transmitter 32. Note that each component of transmission apparatus 30 is specifically implemented by a microcomputer, a processor, dedicated circuitry, or the like.

Transmission apparatus 30 is specifically a broadcasting server, and is an example of the aforementioned "transmission side" in the first exemplary embodiment.

Generator 31 generates, for example, the transfer slot that stores the plurality of slots that each store one or more TLV packets that each store the IP packet (S151 of FIG. 19). In addition, generator 31 contains the reference clock information, such as the NTP, used by reception apparatus 20 for reproduction of content (for example, broadcast content such as video and audio) in the TLV packet positioned at a head within the transfer slot. Specifically, generator 31 includes a coder that codes the broadcast content, MMT multiplexer, IP multiplexer, TLV multiplexer, and the like. Here, the TLV packet is an example of a first transfer unit, the slot is an example of a second transfer unit, and the transfer slot is an example of a transfer frame.

Transmitter 32 transmits the transfer slot generated by generator 31 (transfer channel coded data containing the transfer slot) through broadcast (S152 of FIG. 19).

As also described in the aforementioned first exemplary embodiment, such transmission apparatus 30 contains the reference clock information in the TLV packet positioned at a head within the transfer slot to allow simplification of the processes by which reception apparatus 20 acquires the reference clock information. Therefore, this may shorten time until reception apparatus 20 acquires the reference clock information.

Note that in the aforementioned exemplary embodiment, components may each include dedicated hardware or may be implemented through execution of a software program suitable for each component. The components may be each implemented by a program execution unit, such as a CPU and a processor, reading and executing the software program recorded in a recording medium such as a hard disk and a semiconductor memory.

In addition, the components may be circuits. These circuits may constitute one circuit as a whole, and may be different circuits. In addition, each of these circuits may be a general-purpose circuit, and may be a dedicated circuit.

For example, in each of the aforementioned exemplary embodiments, processes executed by a specific processor may be executed by another processor. In addition, order of the plurality of processes may be changed, and the plurality of processes may be executed in parallel.

The reception apparatus (reception method) and transmission apparatus (transmission method) according to one or more aspects have been described above based on the exemplary embodiment. However, the present disclosure is not limited to this exemplary embodiment. The present exemplary embodiment to which various modifications conceivable by a person skilled in the art are made, and aspects that are made by combining elements of different exemplary embodiments may also be within the scope of the one or more aspects as long as such aspects do not depart from the gist of the present disclosure.

Although various exemplary embodiments have been described above with reference to the drawings, the present disclosure is of course not limited to such an example. It will be evident that various changes or modifications are conceivable by those skilled in the art within the scope described in the appended claims. It is understood that those changes or modifications naturally belong to the technical scope of the present disclosure. Also, without departing from the spirit of the disclosure, the components in the aforementioned exemplary embodiments may be arbitrarily combined.

Although the aforementioned exemplary embodiments have described an example in which the present disclosure is made using hardware, the present disclosure may also be implemented by software in cooperation with hardware.

Also, functional blocks used for description of the aforementioned exemplary embodiments are each typically implemented as an LSI, an integrated circuit having input terminals and output terminals. These may be individually integrated into one chip, and may be integrated into one chip so as to contain part or all of the functional blocks. Although the integrated circuit is an LSI here, the integrated circuit may be referred to as an IC, a system LSI, a super LSI, and an ultra LSI, depending on a difference in a degree of integration.

Also, a method of circuit integration is not limited to LSI, and circuit integration may be implemented using a dedicated circuit or a general-purpose processor. An FPGA (Field Programmable Gate Array), which is programmable after manufacture of an LSI, or a reconfigurable processor, in which connections and settings of circuit cells within the LSI are reconfigurable, may be used.

Furthermore, if an advance in semiconductor technologies or other related technologies yields a circuit integration technology that may substitute for LSI, the functional blocks may of course be integrated using such a technology. For example, adaptation of biotechnology may be possible.

The transmission method according to the present disclosure is useful as a transmission method capable of reducing the processes for acquiring the reference clock information on the reception side when the MMT scheme is applied to a broadcasting system.

What is claimed is:

1. A transmission method, comprising:
   generating one or more frames; and
   transmitting the one or more frames, wherein
   each of the one or more frames contains one or more first transfer units,
   each of the one or more first transfer units contains one or more second transfer units,
   each of the one or more frames contains, outside an IP packet, first control information including control information regarding the one or more first transfer units,
   each of the one or more frames contains, outside the IP packet, second control information including information indicating whether or not the first control information includes reference clock information, the second control information being different from the first control information, and the second control information being stored outside of the one or more first transfer units,
   the first control information includes the reference clock information in the case where the information indicating whether or not the first control information includes the reference clock information indicates that the first control information includes the reference clock information, and
   the first control information includes information indicating a head position of the one or more second transfer units in each of the one or more first transfer units.

2. The transmission method according to claim 1, wherein
   each of the one or more first transfer units is a fixed-length transfer unit, and
   each of the one or more second transfer units is a variable-length transfer unit.

3. The transmission method according to claim 1, wherein
   the one or more first transfer units are one or more slots, and
   the one or more second transfer units are one or more Type Length Value (TLV) packets.

4. The transmission method according to claim 1, wherein the reference clock information is a Network Time Protocol (NTP).

5. The transmission method according to claim 1, wherein in the transmitting, the one or more frames are transmitted in a predetermined transmission cycle.

6. A transmission method, comprising:
   generating one or more frames; and
   transmitting the one or more frames, wherein
   each of the one or more frames contains one or more first transfer units,
   each of the one or more first transfer units contains one or more second transfer units,
   each of the one or more frames contains first control information including control information regarding the one or more first transfer units,
   each of the one or more frames contains second control information including information indicating whether or not the first control information includes reference clock information,
   the first control information includes the reference clock information in the case where the information indicating whether or not the first control information includes the reference clock information indicates that the first control information includes the reference clock information, and
   the first control information includes information indicating a head position of the one or more second transfer units in each of the one or more first transfer units,
   wherein the first control information is a slot header, and
   the second control information is a Transmission and Multiplexing Configuration Control (TMCC) signal.

7. A transmission apparatus, comprising:
   generation circuitry which, in operation, generates one or more frames; and
   transmission circuitry which, in operation, transmits the one or more frames, wherein
   each of the one or more frames contains one or more first transfer units,
   each of the one or more first transfer units contains one or more second transfer units, each of the one or more frames contains, outside an IP packet, first control information including control information regarding the one or more first transfer units, each of the one or more frames contains, outside the IP packet, second control information including information indicating whether or not the first control information includes reference clock information, the second control information being different from the first control information, and the second control information being stored outside of the one or more first transfer units, the first control information includes the reference clock information in the case where the information indicating whether or not the first control information includes the reference clock information indicates that the first control information includes the reference clock information, and the first control information includes information indicating a head position of the one or more second transfer units in each of the one or more first transfer units.

* * * * *